United States Patent [19]

Sasaki et al.

[11] Patent Number: 4,758,885

[45] Date of Patent: Jul. 19, 1988

[54] METHOD OF PROCESSING COLOR IMAGE

[75] Inventors: Takashi Sasaki; Yoshiro Udagawa, both of Tokyo, Japan

[73] Assignee: Canon Kabushiki Kaisha, Tokyo, Japan

[21] Appl. No.: 872,511

[22] Filed: Jun. 10, 1986

[30] Foreign Application Priority Data

Jun. 17, 1985 [JP] Japan .................. 60-131406
Jun. 17, 1985 [JP] Japan .................. 60-131410

[51] Int. Cl.$^4$ .............................................. H04N 1/46
[52] U.S. Cl. .................................... 358/80; 358/75
[58] Field of Search ................................ 358/80, 75, 78

[56] References Cited

U.S. PATENT DOCUMENTS

| | | | |
|---|---|---|---|
| 3,144,510 | 8/1964 | Farber et al. | 358/80 |
| 4,446,470 | 5/1984 | Sugiyama et al. | 358/75 X |
| 4,458,265 | 7/1984 | Yoshida et al. | 358/80 |
| 4,477,833 | 10/1984 | Clark et al. | 358/80 |
| 4,488,171 | 12/1984 | Pugsley et al. | 358/78 X |
| 4,639,770 | 1/1987 | Jung et al. | 358/80 X |
| 4,647,963 | 3/1987 | Johnson et al. | 358/80 |
| 4,668,979 | 5/1987 | Jüng | 358/75 |
| 4,672,433 | 6/1987 | Yamamoto et al. | 358/75 X |
| 4,707,727 | 11/1987 | Penney | 358/80 X |

FOREIGN PATENT DOCUMENTS

| | | | |
|---|---|---|---|
| 60-113241 | 6/1985 | Japan | 358/80 |
| 60-113242 | 6/1985 | Japan | 358/80 |
| 60-113243 | 6/1985 | Japan | 358/80 |

Primary Examiner—Edward L. Coles, Sr.
Assistant Examiner—E. Anne Faris
Attorney, Agent, or Firm—Fitzpatrick, Cella, Harper & Scinto

[57] ABSTRACT

A color image processing method and apparatus whereby a color image signal of an input system having a wide color reproducing range with respect to the brightness and saturation, such as an apparatus for producing a color television signal, is converted into a color image signal of an output system having a narrow color reproducing range, such as an ink jet color printer. With this method, a plurality of color points out of the color reproducing range of the output system are compressed and mapped to a plurality of color points in this range, respectively, with the hue held constant on the basis of a white point on the chromaticity diagram as a standard. In the compressing and mapping processes, the brightness is first compressed and the saturation is then compressed. In this manner, by compressing and mapping each point in the color unreproducible range of the output system to a point in the color reproducible range, a high quality color image can be derived.

11 Claims, 7 Drawing Sheets

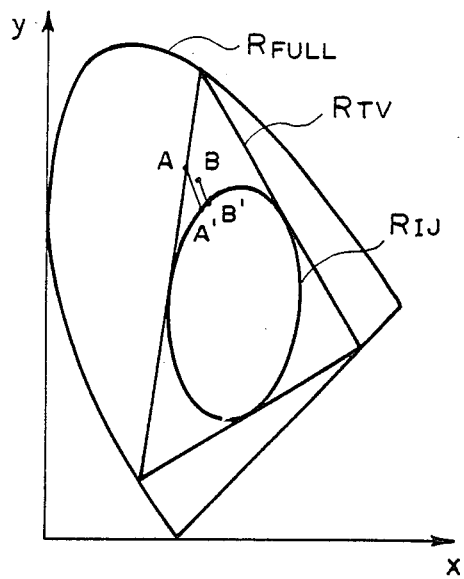
F I G. 1
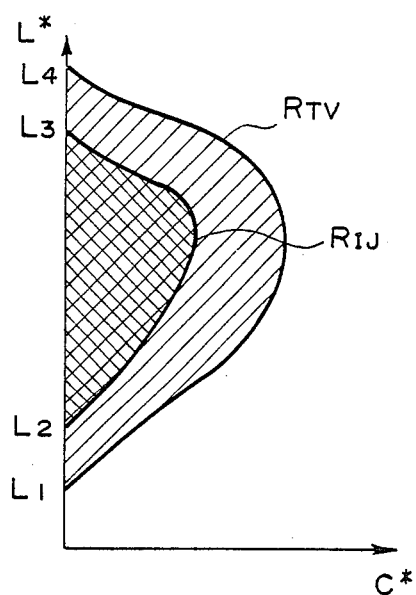
F I G. 2

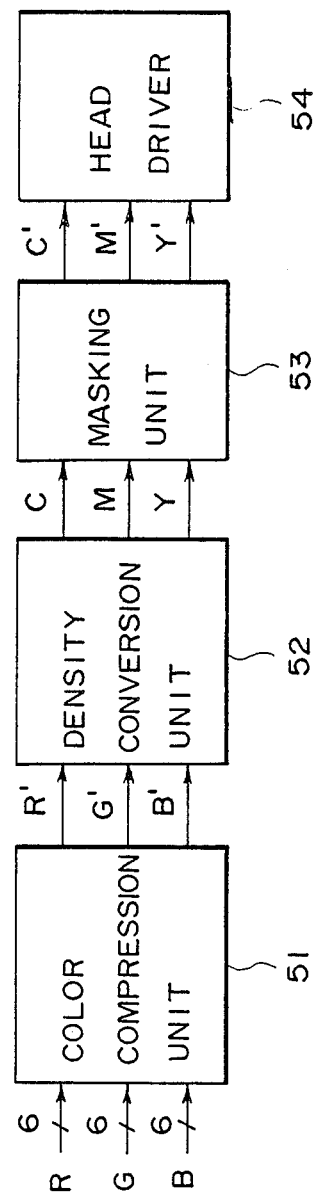
F I G. 6

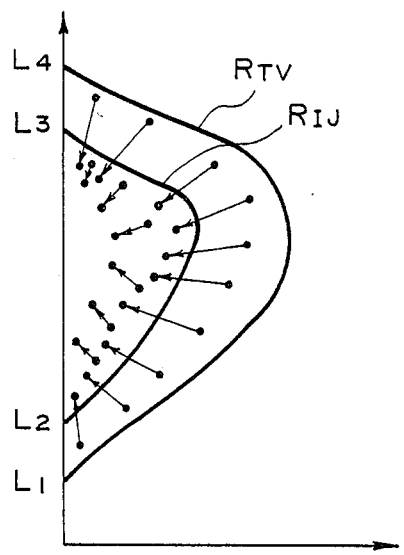
F I G. 11

METHOD OF PROCESSING COLOR IMAGE

BACKGROUND OF THE INVENTION

1. Field of the Invention

The present invention relates to a method of processing a color image and, more particularly, to a color image processing method in the case where the color reproducing range of the output system differs from the color reproducing range of the input system.

The invention also relates to a color image processing method whereby a color image signal of the input system having wide reproducing ranges of, for example, the brightness and saturation of a television image signal or the like is converted into a color image signal of the output system having the narrow reproducing ranges such as a color printer or the like.

2. Related Background Art

An ink jet video printer for reproducing a color television signal by an ink jet printer will now be described hereinbelow as an example.

Generally, in such an apparatus, the color reproducing range of the input system differs from the color reproducing range of the output system. For example, as shown in an x-y chromaticity diagram (CIE chromaticity diagram) of FIG. 1, a color reproducing range $R_{TV}$ in a color television is wider than a color reproducing range $R_{IJ}$ in a color ink jet printer. $R_{FULL}$ denotes a full color range in the natural world.

Hitherto, in particular, there was no method of solving such a problem. Therefore, if it is intended to reproduce the colors which cannot be reproduced by the ink jet printer as shown at, for example, A and B in FIG. 1, they are equivalently reproduced as A' and B'. Thus, the inherent saturation difference and gradation difference between A and B are lost.

Such a phenomenon is particularly typical in the case of the colors of the high purity such as, red rose, deep blue sea, and the like and causes the reproduced image quality to deteriorate remarkably.

This point will now be further described with reference to another chromaticity diagram. Referring now to FIG. 2, the ordinate axis indicates a brightness $L^*$ and the abscissa axis denotes a saturation $C^* = \sqrt{u^{*2} + c^{*2}}$. It will be understood from FIG. 2 that when comparing the color reproducing range $R_{TV}$ of the red hue ($\tan^{-1}(v/u) = 70°$) in the television with the color reproducing ranges $R_{IJ}$ of the ink jet printer, the former is fairly wider than the latter. Therefore, in the case of reproducing the television image by the ink jet printer, the image of the portion in the range $R_{TV}$ excluding the range $R_{IJ}$ is condensed onto the borderline and becomes the extremely unnatural image. This problem cannot be avoided, particularly, in a full color printer because the ideal coloring agents of color inks and color toners and the like do not exist at present.

In spite of the fact that such problems are the fundamental and significant problems in this kind of apparatus as mentioned above, they have conventionally hardly been considered.

SUMMARY OF THE INVENTION

The present invention is made in consideration of the above-mentioned problems and it is an object of the invention to provide a color image processing method whereby even in the case where the color reproducing ranges of the input and output systems differ as well, a high quality image can be reproduced.

More specifically, it is an object of the invention to obtain a high quality color image by compressing and mapping each point in the color unreproducible range of the output system to each point in the color reproducible range.

The above and other objects and features of the present invention will become apparent from the following detailed description and the appended claims with reference to the accompanying drawings.

BRIEF DESCRIPTION OF THE DRAWINGS

FIG. 1 is a diagram showing a color reproducing range $R_{TV}$ of a color television signal and the color reproducing range $R_{IJ}$ of a color ink jet printer on a CIE chromaticity diagram;

FIG. 2 is a diagram showing $R_{TV}$ and $R_{IJ}$ on a chromaticity diagram of the $Lvv^*$ system;

FIG. 6 is a diagram of a signal processing circuit of the first embodiment of the invention;

FIGS. 9, 10 and 11 are explanatory diagrams for explaining the compression mapping of the present invention.

DESCRIPTION OF THE PREFERRED EMBODIMENTS

Figure 3:
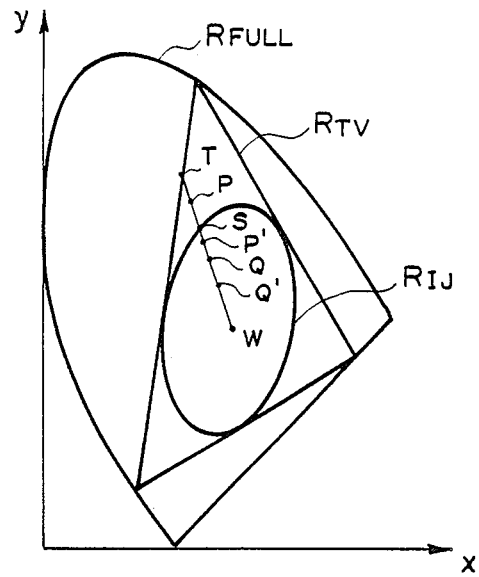
FIG. 3 is a fundamental conceptional diagram of the first embodiment of the invention.

FIG. 3 shows the fundamental concept of the first embodiment of the present invention. Although a color space is inherently three-dimensional, an explanation will be provided with respect to a two-dimensional color space (a CIE chromaticity diagram) for simplicity of explanation.

Now, W is a white point and the case of reproducing colors P and Q will be considered. The colors W, P, and Q exist on a straight line. Namely, the hues of P and Q are the same. T denotes a point where a straight line WP crosses a limit line $R_{TV}$ indicative of the color reproducing range of the television. S represents a point where the straight line WP crosses a limit line $R_{IJ}$ indicative of the color reproducing range of the ink jet printer.

In this case, although Q can be directly reproduced as a color, P cannot be reproduced as it is. Therefore, Q is converted into Q' on the same straight line which satisfies the expression $$\overline{WQ'} = \overline{WQ} \times \overline{WS}/\overline{WT}$$

P is converted into P' on the same straight line which satisfies the expression $$\overline{WP'} = \overline{WP} \times \overline{WS}/\overline{WT}$$

Then, Q' and P' are color reproduced. Due to this method, the color reproduction can be executed without changing the hues of P and Q and with a natural feeling with respect to the difference of the saturation between P and Q as well.

Figure 4:
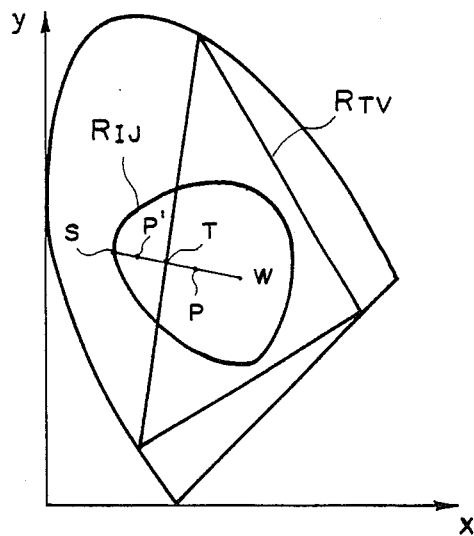
FIG. 4 is an explanatory diagram of another example of the present invention.

If a part of the color reproducing range of the ink jet printer is projected as shown in FIG. 4, a similar idea can be also applied.

In the case of reproducing P, P is converted into P' which satisfies the expression $$\overrightarrow{PW} = \overrightarrow{WS} \times \overrightarrow{WP}/\overrightarrow{WT}$$

and thereafter the color reproduction is executed in a manner similar to the above.

Figure 5:
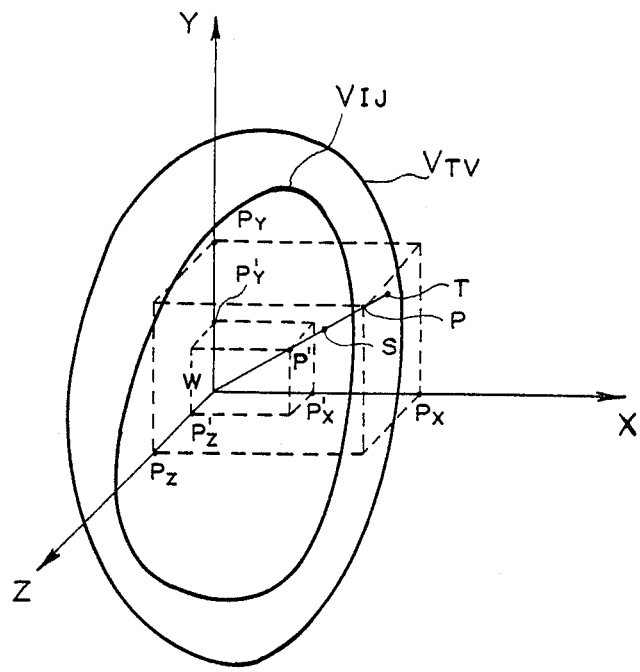
FIG. 5 is a chromaticity diagram for explaining an example of a three-dimensional color space.

In the case of the actual three-dimensional image as well, the color reproduction can be similarly performed. An explanation will be made with reference to FIG. 5. The coordinates of the white point are $\overrightarrow{W} = (X_W, Y_W, Z_W)$. The solid indicative of the color reproducing range in the case of the television is $V_{TV}$. The solid representative of the color reproducing range of the ink jet printer is $V_{IJ}$. The case of reproducing a certain color $\overrightarrow{P} = (P_X, P_Y, P_Z)$ will now be considered.

Assuming that the crossing points of WP and $V_{TV}$ and $V_{IJ}$ are T and S, T and S are unconditionally determined.

At this time, the color $\overrightarrow{P'}$ which is reproduced is given by the following expression.

$$\overrightarrow{P'} = \overrightarrow{W} + \frac{|\overrightarrow{WS}|}{|\overrightarrow{WT}|} \cdot \frac{\overrightarrow{WP}}{|\overrightarrow{WP}|}$$

Due to this, even in the case where the color reproducing ranges of the input and output systems differ as well, the color data is compressed to a form having constant hues and natural brightnesses and saturations, and the high quality image can thereby be derived.

An embodiment of a signal processing circuit to implement the first embodiment of the present invention will now be described with reference to FIG. 6.

A color compression unit 51 receives digital inputs of video signals R, G, and B each consisting of six bits and converts them into data R', G', and B', respectively, subjected to the color compression due to a method which will be explained hereinafter. In this case, this conversion is executed by a table converting method of ROMs of $2^{18}$ bytes and these ROMs can be constituted by three ROMs each consisting of 256 kbits.

A density conversion unit 52 converts the data R', G' and B' into densities C, M, and Y, respectively, of cyan, magenta, yellow by the table converting method respectively. For example, R' is converted in a manner such that $C' = -\log R'$.

A masking unit 53 compensates for the non-saturation (achromatic) color components of the respective color inks and performs the masking, thereby realizing the densities of C, M, and Y on a paper.

For example, it is sufficient to compensate for C', M', and Y' by the linear expressions of C, M, and Y such that $C' = a_{11}c + a_{12}m + a_{13}y$. These compensations are carried out by use of the table conversion.

The density values C', M', and Y' to be output are then converted into driving voltages for driving respective heads by a head driver unit 54. The ink jet heads are driven on the basis of the driving voltages.

The ROM data which is preliminarily stored to the color compression unit 51 will now be described. The coordinates of a color solid assume a orthogonal system of three stimulus values X, Y, and Z.

First, the color solid $V_{TV}$ which can be expressed by the television is given as follows due to the NTSC standard.

$$\begin{pmatrix} R \\ G \\ B \end{pmatrix} = \begin{pmatrix} 1.9106 & -0.5326 & -0.2883 \\ -0.9843 & 1.9984 & -0.0283 \\ 0.0584 & -0.1185 & 0.8985 \end{pmatrix} \begin{pmatrix} X \\ Y \\ Z \end{pmatrix} \quad (1)$$

By adding the conditions of $0 \leq R \leq 1$, $0 \leq G \leq 1$, and $0 \leq B \leq 1$ to this expression (1), it represents a rectangular parallelepiped in the XYZ system. In this case, an area $S_{TV}$ is determined by equations $f_1(X, Y, Z) = 0, \ldots, f_6(X, Y, Z) = 0$ of six planes.

On the other hand, an area $S_{IJ}$ of the color reproducing region $V_{IJ}$ of the ink jet can be generally expressed as $f(X, Y, Z) = 0$ and, for example, it can be approximated as follows.

Figure 7:
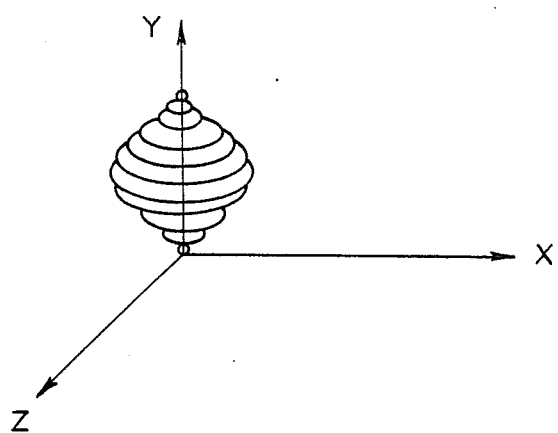
FIG. 7 is a diagram showing the color reproducing range of a color ink jet printer in a three-dimensional color space.

Namely, a solid whose radius varies as the brightness in the Y direction increases as shown in FIG. 7 is considered and it can be expressed as follows.

$$aX^2 + bZ^2 = f(Y)^2 \quad (2)$$

The inputs R, G, and B are converted into $$\overrightarrow{P} = \begin{pmatrix} P_X \\ P_Y \\ P_Z \end{pmatrix} = \begin{pmatrix} 0.6067 & 0.1736 & 0.2001 \\ 0.2988 & 0.5868 & 0.1144 \\ 0 & 0.0661 & 1.1150 \end{pmatrix} \begin{pmatrix} R \\ G \\ B \end{pmatrix} \quad (3)$$

due to the NTSC standard.

Assuming that the white point is $\overrightarrow{W} = (W_X, W_Y, W_Z)$, the equation of the straight line $\overrightarrow{PW}$ can be expressed as follows.

$$\frac{X - W_X}{P_X - W_X} = \frac{Y - W_Y}{P_Y - W_Y} = \frac{Z - W_Z}{P_Z - W_Z} \quad (4)$$

Two solutions $\overrightarrow{T_1}$ and $\overrightarrow{T_2}$ are obtained by solving expression (1) by substituting expression (4) for expression (1). The solution in the direction of $\overrightarrow{WP}$ is set to $\overrightarrow{T}$.

Two solutions $\overrightarrow{S_1}$ and $\overrightarrow{S_2}$ are derived by solving expression (2) by substituting expression (4) for expression (2). The solution in the direction of $\overrightarrow{WP}$ is set to $\overrightarrow{S}$. These solutions are unconditionally determined. Now, by setting $$P' = \begin{pmatrix} X' \\ Y' \\ Z' \end{pmatrix}$$

X', Y', and Z' which satisfy $$\overrightarrow{WP'} = \frac{\overrightarrow{WP}}{|\overrightarrow{WP}|} \cdot \frac{|\overrightarrow{WS}|}{|\overrightarrow{WT}|} \quad (5)$$

are obtained. The point which is defined by X', Y', and Z' is the point P' which was color compressed, Then, R', G', and B' are again obtained by expression (6) of the NTSC standard and these data are set as follows.

$$\begin{pmatrix} R' \\ G' \\ B' \end{pmatrix} = \begin{pmatrix} 1.9106 & -0.5326 & -0.2883 \\ -0.9843 & 1.9984 & -0.0283 \\ 0.0584 & -0.1185 & 0.8985 \end{pmatrix} \begin{pmatrix} X \\ Y \\ Z \end{pmatrix} \quad (6)$$

The values of R', G', and B' which are decided from the data R, G, and B in this manner are stored in the ROM 51 using inputs as addresses.

As described above, the color reproducing range of the input system can be compressed to the color reproducing range of the output system without changing the hue. Therefore, a good color image is obtained as well in the case of forming a color image in which the color reproducing ranges of the input and output systems differ.

Although three stimulus values X, Y, and Z have been considered as the coordinates of the color solid in the first embodiment, the other Lab* system, Luv* system, or the like may be adopted.

The second embodiment using the Luv* system will now be described.

Figure 8:
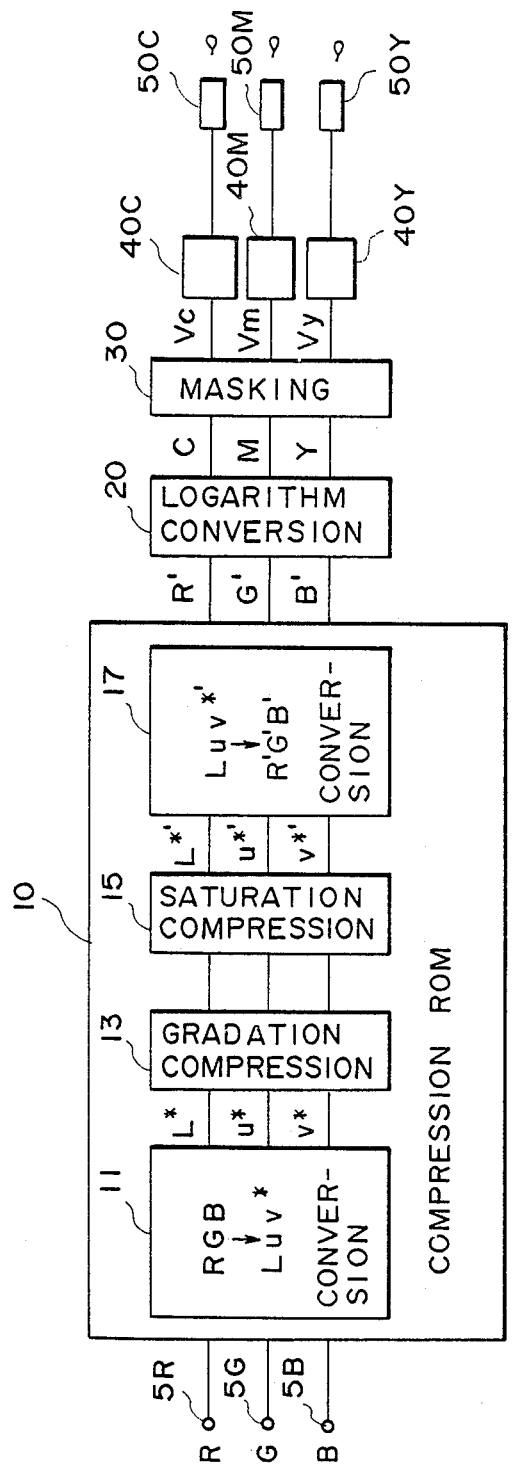
FIG. 8 is a color image signal processing block diagram of a second embodiment.

FIG. 8 shows a fundamental processing block diagram of the second embodiment.

In FIG. 8, reference numerals 5R, 5G, and 5B denote input terminals of color television signals of R, G, and B, respectively. Numeral 10 indicates a compression ROM (Read Only Memory for performing the compression mapping. The ROM 10 comprises: an RGB-to-Luv* conversion unit 11; a gradation (brightness) compression unit 13; a saturation compression unit 15; and an Luv*'-to-R'G'B' conversion unit 17. A logarithm conversion ROM 20 logarithmically converts the signals R', G', and B' of three primary colors of an additive color process into the signals of cyan C, magenta M, and yellow Y of three primary colors of a subtractive color process for printing, respectively. Numeral 30 indicates a masking ROM for removing the non-saturation (achromatic) color; 40C, 40M, and 40Y are digital-to-analog (D/A) conversion units for converting the digital signals into the analog signals for driving ink jet heads; and 50C, 50M, and 50Y are the ink jet heads, respectively.

The operation of this embodiment will be explained hereinbelow.

The RBG signals for every pixel of the television are converted to the Luv* system by the conversion unit 11 in accordance with the following expression.

$$\begin{cases} \begin{bmatrix} X \\ Y \\ Z \end{bmatrix} = A \begin{bmatrix} R \\ G \\ B \end{bmatrix} \quad A = \begin{bmatrix} 0.6067, & 0.1736, & 0.2001 \\ 0.2988, & 0.5868, & 0.1144 \\ 0, & 0.0661, & 1.1150 \end{bmatrix} \\ u' = 4X/X + 15Y + 3Z \\ v' = 9Y/X + 15Y + 3Z \\ L^* = 116 \, (Y/Y_0)^{\frac{1}{3}} - 16 \\ L^* = 0 \\ u^* = 13L^*(u' - u_0) \\ v^* = 13L^*(v' - v_0) \end{cases}$$

$Y/Y_0 > 0.01$
where, $Y_0 = 100$
$Y/Y_0 < 0.01$
where, $u_0 = 0.2009$ where, $v_0 = 0.4609$ These L*, u*, and v* are converted into L*', u*', and the v*' by the gradation compression unit 13 and saturation compression unit 15 in accordance with the predetermined constant mapping functions $f_L$, $f_u$, and $f_v$, thereby compressing the brightness and saturations. The functions $f_L$, $f_u$, and $f_v$ will be explained hereinafter.

$$\begin{cases} L^{*'} = f_L(L^*, u^*, v^*) \\ u^{*'} = f_u(L^*, u^*, v^*) \\ v^{*'} = f_v(L^*, u^*, v^*) \end{cases} \quad (8)$$

Next, R', G', and B' are calculated by solving expression (7) in reverse from L*', u*', and v*' by the conversion unit 17, so that R', G', and B' are obtained.

When considering the above operations, it will be understood that the outputs R', G', and B' can be unconditionally determined from the inputs R, G, and B by use of the predetermined functions $f_L$, $f_u$, and $f_v$. Therefore, the above-mentioned portions can be constituted by the table conversion memory (ROM) 10 which receives the inputs R, G, and B as the addresses.

Since R', G', and B' are the signals which have already been compressed within the color reproducing ranges of the ink jet heads, these signals are converted into the density signals C, M, and Y by the logarithm conversion ROM 20 and further converted into digital values $V_c$, $V_m$, and $V_y$ of the head driving voltages corresponding thereto by the masking unit 30, respectively.

The logarithm conversion and masking units may be constituted by the table conversion ROM which receives the inputs by the table conversion ROM which receives the inputs as the addresses.

Further, these digital values are converted into analog voltages for driving the heads by the D/A converters 40C, 40M, and 40Y, thereby driving the ink jet heads 50C, 50M, and 50Y.

A method of determining the maps $f_L$, $f_u$, and $f_v$ to realize the compression will now be described.

Figure 9:
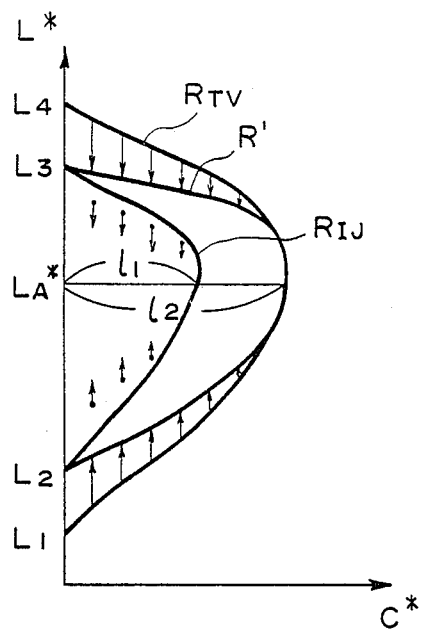

First, the brightness is compressed. As shown in FIG. 9, the maximum value and minimum value of the brightness of the input system with regard to a certain hue assume $L_4$ and $L_1$ and those of the output system assume $L_3$ and $L_2$, respectively. The inputs L*, u*, and v* are converted into L*'', u*'', and v*'' in accordance with the following expressions, rspectively.

$$\begin{bmatrix} L^{*''} = L_2 + \dfrac{L_3 - L_2}{L_4 - L_1} \cdot (L^* - L_1) \\ u^{*''} = u^* \\ v^{*''} = v^* \end{bmatrix}$$

Namely, with respect to only the brightness, the compression is carried out in accordance with the ratio of the reproduced brightnesses of the input and output systems. By executing these operations with regard to all of the hues ($\theta = \tan^{-1}(v^*/u^*)$, the reproducing range $R_{TV}$ of the input system is compressed with the saturation C* held as indicated by arrows in a range R' as shown in FIG. 9.

Next, the compression in the direction of saturation is executed.

First, a certain hue $\theta$ is considered. ($\theta = \tan^{-1}(v^*/u^*)$)

In this case, the lengths in the saturation direction in the region corresponding to a certain brightness $L_A$ assume $l_1$ and $l_2$. At this time, $L^{*''}$, $u^{*''}$, and $v^{*''}$ are converted into $L^{*'}$, $u^{*'}$, and $v^{*'}$ in the following manner.

$$\begin{bmatrix} L^{*'} = L^{*''} \\ u^{*'} = C^* \cdot \frac{l_1}{l_2} \times \cos\theta \\ v^{*'} = C^* \cdot \frac{l_1}{l_2} \times \sin\theta \end{bmatrix}$$

$$\theta = \tan^{-1} \frac{v^{*''}}{u^{*''}}$$

$$C^* = \sqrt{u^{*''2} + v^{*''2}}$$

In this manner, the saturation is compressed in accordance with the ratio of the reproducing saturations of the input and output systems.

Figure 10:
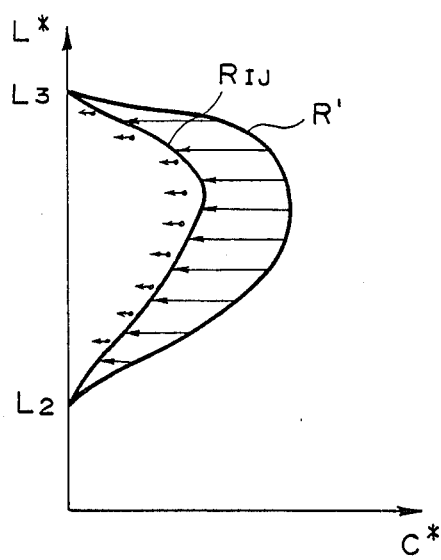

According to the above method, as shown in FIG. 10, R' is converted into the reproducing range $R_{IJ}$ of the ink jet printer while the brightness before the saturation is converted, is held even after it was converted.

When considering a certain hue, the color range $R_{TV}$ of the color television signal is compressed and mapped to the reproducing range $R_{IJ}$ of the ink jet printer as shown in FIG. 11.

The brightness is compressed before the saturation is compressed for the following reason. If the saturation is first compressed, the saturation is compressed to zero since the reproducing saturation of $R_{IJ}$ doesn't exist in the regions $L_1$ to $L_2$ and $L_3$ to $L_4$ regarding the brightness, and even if it is further compressed with respect to the brightness as well, the zero saturation doesn't change. In other words, when the saturation is first compressed, the distorted compression mapping is performed, resulting in deterioration in image quality.

On the other hand, in the case of first compressing the brightness as mentioned in the embodiment, the uniform compression can be executed with respect to each point on the chromaticity diagram and the image quality hardly deteriorates.

One of the compressing methods has been described above. However, it is also possible to use the following method. Namely, the colors to be converted ($L^*_i'$, $u^*_i'$, $v^*_i'$) are predetermined with respect to a proper number N of representative colors ($L^*_i$, $u^*_i$, $v^*_i$) (i=1,2, ..., N) in and out of the reproducing range, these colors are applied due to a method of least squares, thereby deciding $f_L$, $f_u$, and $f_v$.

The color system is not limited to only Luv* but other color system of the luminance-color difference system may be also used and in this case, the similar effect is obtained.

In the above embodiment, the compression ROM 10, logarithm conversion ROM 20, and masking ROM 30 have been separated and constituted by ROMs, respectively. However, since the outputs are unconditionally decided from the inputs R, G, and B, those circuits may be together constituted by one ROM or the order of arrangement of those circuits may be reversed and the compressing process may be also carried out after the logarithm conversion.

In this manner, after the input television signal was once compressed into the reproducing range of the ink jet printer, it is recorded. Therefore, the color range which cannot be reproduced by the ink jet printer is compressed into the reproducing range of the printer in its natural form. Consequently, the resultant color image is also extremely natural and has a high quality.

The color image signal of the input system is not limited to a television signal. An output signal from a solid-state image pickup device and the like can be also used if their color reproducing ranges are wider than that of the output system.

The output system is not limited to the ink jet printer as well, but the invention can be also applied to various kinds of printers such as an electronic photographic printer, thermal printer, and the like, or display devices having a relatively narrow color reproducing range, or the like.

As described above, according to the present invention, the input color image signal having a wider color reproducing range than that of the output system can be compressed and mapped in its natural form. The optimum processing method for obtaining a color image of a high quality can be provided.

What is claimed is:

1. A method of processing a color image, wherein in the case where a color reproducing range of an output system differs from that of an input system, said method comprising the steps of:
    extracting, from a color component signal input through said input system, a brightness signal representing brightness, a hue signal representing hue and a saturation signal representing saturation;
    first compressing the brightness signal within a brightness reproducible range of said output system;
    second compressing, after said first compressing step, the saturation signal within a saturation reproducible range of said output system;
    obtaining a plurality of primary color signals on the basis of the compressed brightness signal compressed in the first compressing step, the compressed saturation signal compressed in the second compressing step, and the hue signal; and
    supplying the plurality of primary color signals to said output system.

2. A color image processing method according to claim 1, wherein in said first and second compressing steps, the compressing processes are executed using a white point on a chromaticity diagram as a standard.

3. A color image processing method according to claim 1, wherein said input system is a device for generating a color television signal and said output system is a color printer.

4. A color image processing method according to claim 3, wherein said color printer is an ink jet color printer.

5. A color image processing method according to claim 1, further comprising the steps of:
    obtaining a relation between the color component signal and the primary color signal through said extracting step, said first compressing step, said second compressing step and said primary color signal obtaining step;
    storing said relation between the color component signal and the primary color signal in a memory; and performing color image processing by said memory in which the color component signal is used as an input address and the primary color signals are produced as output data.

6. A color image processing apparatus in which a color reproducing range of an output system differs from that of an input system, comprising:
   input means for inputting a color component signal supplied from said input system;
   brightness compression means for compressing a brightness portion of the color component signal to produce a brightness compressed color component signal, in accordance with a brightness range of the input color component signal and a brightness reproducible range of said output system;
   saturation compression means for compressing a saturation portion of the brightness compressed color component signal obtained by said brightness compression means to produce a brightness and saturation compressed color component signal, in accordance with a saturation range of the input color component signal and a saturation reproducible range of said output system; and
   supply means for supplying the brightness and saturation compressed color component signal obtained by said saturation comprssion means to said output system.

7. A color image processing apparatus according to claim 6, wherein said input system includes an apparatus which generates a color television signal.

8. A color image processing apparatus according to claim 6, wherein said output system includes a color printer.

9. A color image processing apparatus according to claim 6, wherein said brightness compression means and said saturation compression means include a table memory in which a color digital value corresponding to the input color component signal is used as an address and in which compressed data is generated as an output digital value.

10. A method of processing a color image, in the case where a color reproducing range of an output system differs from that of an input system, comprising the steps of:
    providing a digital color signal corresponding to a color component signal from said input system;
    first compressing the brightness of the digital color signal;
    second compressing, after said first compressing step, the saturation of the digital color signal; and
    executing said first and second compressing steps by memory means in which the digital color signal is used as an input address and compressed data is produced as output data.

11. A method of processing a color image according to claim 10, wherein said memory means comprises a single memory member for said first and second compressing steps, and in said memory means the digital color signal is used as an input address and the data compressed in said second compressing step is used as output data.

* * * * *

UNITED STATES PATENT AND TRADEMARK OFFICE
CERTIFICATE OF CORRECTION

PATENT NO. : 4,758,885
DATED : July 19, 1988
INVENTOR(S) : TAKASHI SASAKI, ET AL.

It is certified that error appears in the above-identified patent and that said Letters Patent is hereby corrected as shown below:

COLUMN 1

Line 39, "red rose," should read --rose red,--.
Line 40, "blue sea," should read --sea blue,--.
Line 49, "ranges" should read --range--.

COLUMN 3

Line 9, "$\overline{P'W} = \overline{WS} \times \overline{WP}/\overline{WI}$" should read --$\overline{P'W} = \overline{WS} \times \overline{WP}/\overline{WT}$--.
Line 22, "$\overline{WP}$" should read --$\overrightarrow{WP}$--.
Line 23, "$\vec{T}$ and $S_\bullet$, $\vec{T}$ and $S$" should read --$\vec{T}$ and $\vec{S}$, $\vec{T}$ and $\vec{S}$--.
Lines 28-29, "$\vec{P'} = \vec{W} + \dfrac{\overline{WS}}{\overline{WT}} \cdot \dfrac{\overline{WP}}{\overline{WP}}$"

should read
--$\vec{P'} = \vec{W} + \dfrac{\overrightarrow{WS}}{\overrightarrow{WT}} \cdot \dfrac{\overrightarrow{WP}}{\overrightarrow{WP}}$--.

Line 42, "due to" should read --by--.
Line 65, "to" should read --in--.
Line 67, "a" (second occurrence) should read --an--.

COLUMN 4

Lines 54-57, "$P' = \begin{pmatrix} X' \\ Y' \\ Z' \end{pmatrix}$" should read --$\vec{P'} = \begin{pmatrix} X' \\ Y' \\ Z' \end{pmatrix}$--.

UNITED STATES PATENT AND TRADEMARK OFFICE
CERTIFICATE OF CORRECTION

PATENT NO. : 4,758,885
DATED : July 19, 1988
INVENTOR(S) : TAKASHI SASAKI, ET AL.

It is certified that error appears in the above-identified patent and that said Letters Patent is hereby corrected as shown below:

COLUMN 4 (continued)

Lines 61-63, "$\vec{WP'} = \frac{\vec{WP}}{|\vec{WP}|} \cdot \frac{|\vec{WS}|}{|\vec{WT}|}$"

should read

--$\vec{WP'} = \frac{\vec{WP}}{|\vec{WP}|} \cdot \frac{|\vec{WS}|}{|\vec{WT}|}$--.

COLUMN 5

Line 29, "Memory" should read --Memory)--.
Line 53, --(7)-- should be inserted at right margin.

COLUMN 6

Line 5, "the" (first occurrence) should be deleted.
Line 5, "and satura-" should read --and the satura- --.
Line 26, "conversion" should read --converting--.
Line 38, "by the table conversion ROM which" should be deleted.
Line 39, "receives the inputs" should be deleted.
Line 52, "rspectively" should read --respectively--.
Line 65, "($\theta=\tan^{-1}(v*/u*)$)," should read
--($\theta=\tan^{-1}(v*/u*)$),--.
Line 65, "the reproducing range $R_{TV}$" should be in regular typeface.

UNITED STATES PATENT AND TRADEMARK OFFICE
CERTIFICATE OF CORRECTION

PATENT NO. : 4,758,885

DATED : July 19, 1988

INVENTOR(S) : TAKASHI SASAKI, ET AL.

It is certified that error appears in the above-identified patent and that said Letters Patent is hereby corrected as shown below:

COLUMN 7

Line 3, "$(\theta=\tan^{-1}(v*/u*)$" should read --$(\theta=\tan^{-1}(v*/u*)$--.

Line 5, "$L_A$" should read --$L_A*$--.

Line 54, "due to" should read --by--.

COLUMN 8

Line 15, "electronic photographic" should read --electrophotographic--.

Signed and Sealed this

Twenty-eighth Day of February, 1989

Attest:

DONALD J. QUIGG

Attesting Officer

Commissioner of Patents and Trademarks